(12) United States Patent
Toshikawa

(10) Patent No.: US 9,550,320 B2
(45) Date of Patent: Jan. 24, 2017

(54) SYNTHETIC RESIN CONTAINER MANUFACTURING METHOD AND SYNTHETIC RESIN CONTAINER

(71) Applicant: TOSHIKAWA PLASTIC CO., LTD., Shiga (JP)

(72) Inventor: Akira Toshikawa, Shiga (JP)

(73) Assignee: KABUSHIKI KAISHA TOSHIPLA, Shiga (JP)

( * ) Notice: Subject to any disclaimer, the term of this patent is extended or adjusted under 35 U.S.C. 154(b) by 53 days.

(21) Appl. No.: 14/360,062

(22) PCT Filed: Aug. 1, 2013

(86) PCT No.: PCT/JP2013/070891
§ 371 (c)(1),
(2) Date: May 22, 2014

(87) PCT Pub. No.: WO2015/015618
PCT Pub. Date: Feb. 5, 2015

(65) Prior Publication Data
US 2015/0231813 A1 Aug. 20, 2015

(51) Int. Cl.
*B29C 49/20* (2006.01)
*B65D 25/30* (2006.01)
*B29D 22/00* (2006.01)
*B29L 31/00* (2006.01)

(52) U.S. Cl.
CPC .............. *B29C 49/20* (2013.01); *B29D 22/003* (2013.01); *B65D 25/30* (2013.01); *B29C 2049/2004* (2013.01); *B29L 2031/712* (2013.01)

(58) Field of Classification Search
None
See application file for complete search history.

(56) References Cited

U.S. PATENT DOCUMENTS

| 3,744,656 A | 7/1973 | Wolfram |
| 2003/0148050 A1* | 8/2003 | Taniguchi ............... B29C 49/20 428/35.7 |
| 2011/0037203 A1 | 2/2011 | Gotsu |

FOREIGN PATENT DOCUMENTS

| CN | 101214725 | 7/2008 |
| DE | 2056247 | 5/1972 |
| JP | 47-9944 | 5/1972 |
| JP | 52-53417 | 4/1977 |
| JP | 1-63529 | 4/1989 |

(Continued)

OTHER PUBLICATIONS

International Search Report issued Nov. 5, 2013 in International (PCT) Application No. PCT/JP2013/070891.

*Primary Examiner* — Monica Huson
(74) *Attorney, Agent, or Firm* — Wenderoth, Lind & Ponack, L.L.P.

(57) ABSTRACT

The invention provides a synthetic resin container with a plurality of handgrips on its top face and a manufacturing method for such a container. The plurality of handgrips, as well as a metal cap opening, are molded in advance as insertion components. After heating the fusion portions of the insertion components, the insertion components are disposed parallel to the direction in which a parison is to be placed. Thereafter, a parison is placed into dies, and the dies are clamped. Air is blown into the parison through the metal cap opening to fuse the parison and the insertion components.

18 Claims, 24 Drawing Sheets

(56) References Cited

FOREIGN PATENT DOCUMENTS

| | | |
|---|---|---|
| JP | 2-73132 | 6/1990 |
| JP | 5-42116 | 6/1993 |
| JP | 06-199350 | 7/1994 |
| JP | 7-19141 | 4/1995 |
| JP | 09-295341 | 11/1997 |
| JP | 11-254511 | 9/1999 |
| JP | 2003-236920 | 8/2003 |
| JP | 3955089 | 8/2007 |
| JP | 2007-320156 | 12/2007 |
| JP | 2008-284746 | 11/2008 |
| JP | 2009-274429 | 11/2009 |

\* cited by examiner (a)

(b)

(c)

(a)

(b)

(a)

(b)

SYNTHETIC RESIN CONTAINER MANUFACTURING METHOD AND SYNTHETIC RESIN CONTAINER

TECHNICAL FIELD

The present invention relates to synthetic resin container manufacturing methods and synthetic resin containers.

BACKGROUND ART

Patent Documents 1 and 2 disclose synthetic resin containers of rectangular parallelepiped shape. The containers have an opening to be closed by a metal cap ("metal cap opening") formed at least near an end of their top face and three handgrips disposed parallel to each other along the (longer) sides of the top face. When two of these containers are joined so that their handgrips become parallel to one another, those handgrips which are placed far out on each container are closely positioned, which enables one to hold both of those handgrips at a time. By placing fingers under the handgrips, one can carry two containers by one hand and a maximum of four containers by both hands at a time.

If the container becomes heavy as more contents are put in the container, two persons can hold the handgrips on the two sides of the top face of the container by reaching for them from the respective sides to cooperate and carry a single container.

Patent Documents 1 and 2 do not disclose a manufacturing method for these containers. Patent Document 3 is conventionally known to disclose a manufacturing method for a container with a single handgrip.

Patent Document 3 discloses a container manufacturing method that includes placing a parison in a pair of dies composed of a cavity for molding a container main portion including a metal cap opening and a cavity for molding a handgrip portion, clamping the pair of dies, and subsequently blowing air into the parison. This method molds both the container main portion and the handgrip portion simultaneously in a single die by blow molding.

CITATION LIST

Patent Literature

Patent Document 1: Japanese Utility Model Publication, Jitsukaisho, No. 52-53417
Patent Document 2: Japanese Utility Model Publication, Jitsukaihei, No. 2-73132
Patent Document 3 Japanese Patent No. 3955089

SUMMARY OF THE INVENTION

Problems to be Solved by the Invention

According to the manufacturing method of Patent Document 3, after the container main portion and the handgrip portion are molded simultaneously in a single die by blowing air into the parison inside the dies, the pair of dies are opened, and the molded article is ejected from the dies, which completes the manufacture of a container. To eject the container handgrip portion from the dies in this method, the handgrip portion must be located on the parting face of the pair of dies. Otherwise, the handgrip portion cannot be ejected from the dies when they are opened. Therefore, the manufacturing method of Patent Document 3 can inherently only manufacture containers with a single handgrip. In other words, the containers of Patent Documents 1 and 2 cannot be manufactured by the manufacturing method of Patent Document 3.

Furthermore, according to the container manufacturing method of Patent Document 3, the metal cap opening portion of the container is also molded simultaneously with the container main portion and the handgrip portion. The metal cap opening needs to be externally threaded all around it so that it can engage the screw cap to tightly close the container.

According to the manufacturing method disclosed in Patent Document 3, however, the molded metal cap opening portion will have a parting line because the metal cap opening portion is located on the parting face of the dies similarly to the handgrip portion. If the metal cap opening has a parting line on it, it becomes so difficult to mold an external thread with a specific shape on that portion that the screw cap may not tightly fit the metal cap opening.

In view of these problems, it is an object of the present invention to provide a synthetic resin container with a plurality of handgrips on its top face and to provide a manufacturing method for such a container.

Solution to Problem

The present invention has the following features to achieve the object.

A synthetic resin container manufacturing method in accordance with the present invention is a method for manufacturing a synthetic resin container by blow molding, the synthetic resin container including: a metal cap opening formed at least near an end of a top face thereof; and a plurality of handgrips disposed parallel to each other on the top face, the method including:

the insertion component heating step of preparing the metal cap opening and the plurality of handgrips as insertion components by molding and of heating fusion portions of the insertion components at a fusion temperature of the insertion components;

the insertion component disposing step, implemented subsequent to the insertion component heating step, of disposing the insertion components in dies with the fusion portions of the insertion components being positioned to face interiors of the dies, so that the insertion components are parallel to a direction in which a parison is to be placed; and the container molding step, implemented subsequent to the insertion component disposing step, of placing a parison in the dies and clamping the dies and of subsequently blowing air into the parison through the metal cap opening to fuse the parison and the insertion components.

These features enable manufacture of synthetic resin containers which may have a complex structure including multiple handgrips. In addition, since the insertion components are individually molded in advance, the insertion components can be molded by a molding method that produces no parting line as clearly visible as does conventional art. Accordingly, of the insertion components, especially, the metal cap opening can have an external thread of a specific shape readily formed on its external surface. A screw cap that seals the metal cap opening can be tightly attached to the metal cap opening. Furthermore, since the screw cap tightly fits the metal cap opening, packing, which has been used conventionally to enhance tightness, is no longer required.

The method for manufacturing a synthetic resin container may further include, prior to the blowing in the container molding step, sliding either at least the opening or all the insertion components into the dies.

According to these features, of the insertion components, at least the opening is moved closer to the parison before air is blown into the parison. That renders failures less likely to develop in the fusing of the parison and the opening, which in turn ensures good fusing of the parison and the opening. Insertion components other than the opening may also be slid into the dies.

The method for manufacturing a synthetic resin container may further include preparing a secondary handgrip as another insertion component by molding and disposing the secondary handgrip on a bottom face of the synthetic resin container and diagonally from the metal cap opening.

According to these features, when the contents of the synthetic resin container are to be discharged through the metal cap opening, one can readily discharge the contents through the metal cap opening by holding the secondary handgrip as well as one of the handgrips to tilt the synthetic resin container.

In the method for manufacturing a synthetic resin container, all or any one of the plurality of handgrips and the secondary handgrip have formed thereon a hand-held wavy section that fits fingers.

According to these features, the plurality of handgrips and the secondary handgrip have formed thereon a hand-held wavy section that fits fingers. One can firmly hold the handgrips and carry the synthetic resin container with ease.

A synthetic resin container in accordance with the present invention is a synthetic resin container manufactured by the synthetic resin container manufacturing method in accordance with the present invention.

Another synthetic resin container in accordance with the present invention is a synthetic resin container manufactured by blow molding, the synthetic resin container including: a metal cap opening on a top face of a container main body thereof; and a plurality of handgrips fused onto the top face.

The synthetic resin container may further include a secondary handgrip on a bottom face of the container main body and diagonally from the metal cap opening.

According to these features, a plurality of handgrips are provided on the top face so that two persons can cooperate and carry a single container together. If there are provided a metal cap opening at least near an end of the top face and a plurality of handgrips along the (longer) sides of the top face, and two of the synthetic resin containers in accordance with the present invention are joined so that their handgrips become parallel to one another, those handgrips which are placed far out on each container are closely positioned, which enables one to hold both of those handgrips at a time. By placing fingers under the handgrips, one can carry two containers by one hand and a maximum of four containers by both hands at a time. If the container becomes heavy as more contents are put in the container, two persons can hold the handgrips on the two sides of the top face of the container by reaching for them from the respective sides to carry the container together.

Advantageous Effects of the Invention

The present invention is capable of providing a synthetic resin container with a plurality of handgrips on its top face and a manufacturing method for such a container.

BRIEF DESCRIPTION OF DRAWINGS

FIG. 5(a) is a perspective view of a metal cap opening component. FIG. 5(b) is a perspective view of a handgrip component. FIG. 5(c) is a perspective view of a secondary handgrip component.

FIG. 6(a) is a perspective view of the first component holder. FIG. 6(b) is a bottom view for FIG. 6(a).

FIG. 7(a) is a perspective view of the first component holder. FIG. 7(b) is a bottom view for FIG. 7(a).

DESCRIPTION OF EMBODIMENTS

The following will describe embodiments in accordance with the present invention: first, a description of a synthetic resin container in accordance with the present embodiment, followed by a description of a manufacturing method for the synthetic resin container.

Synthetic Resin Container in Accordance with Present Embodiment

Structure of Synthetic Resin Container in Accordance with Present Embodiment

A synthetic resin container in accordance with the present embodiment will be described in reference to FIGS. 1A to 4.

Figure 1A:
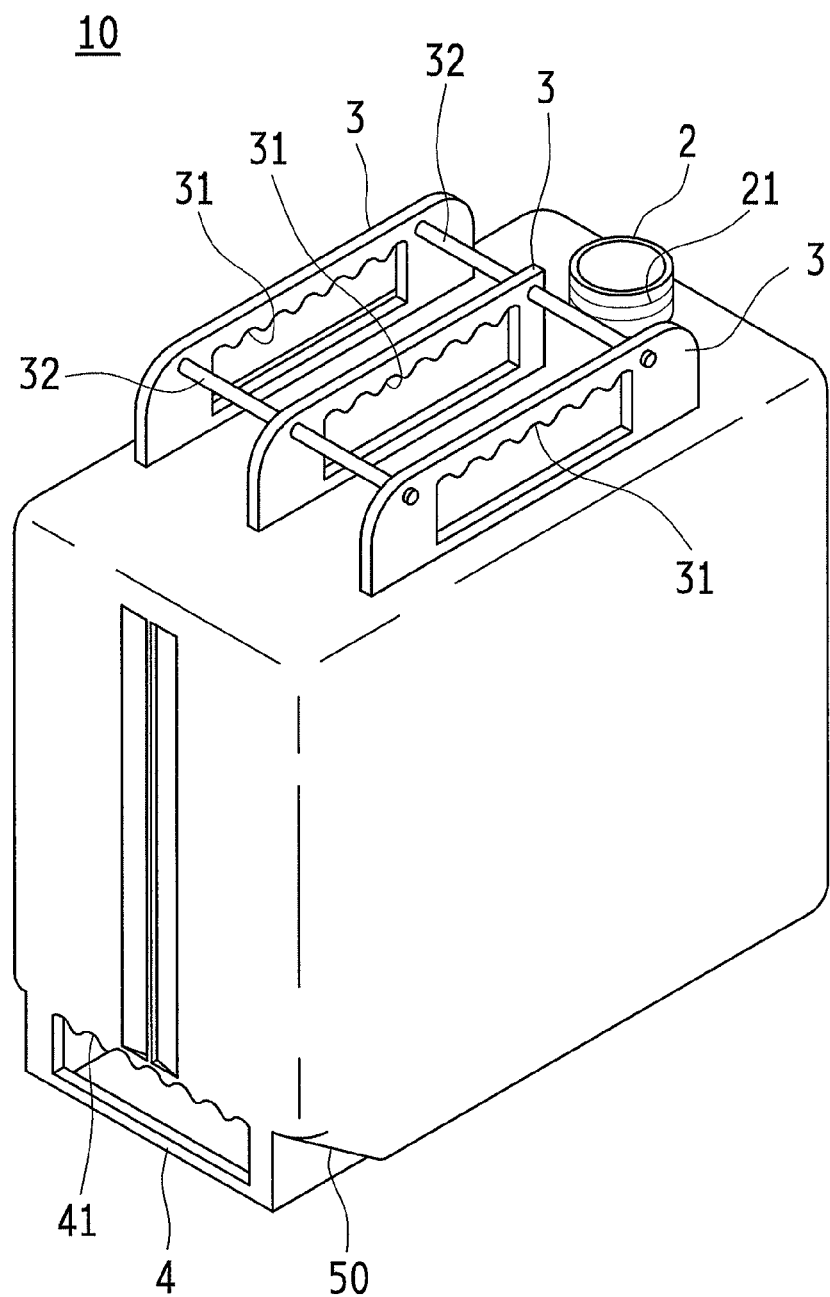
FIG. 1A is a perspective view of a synthetic resin container in accordance with the present invention.
Figure 1B:
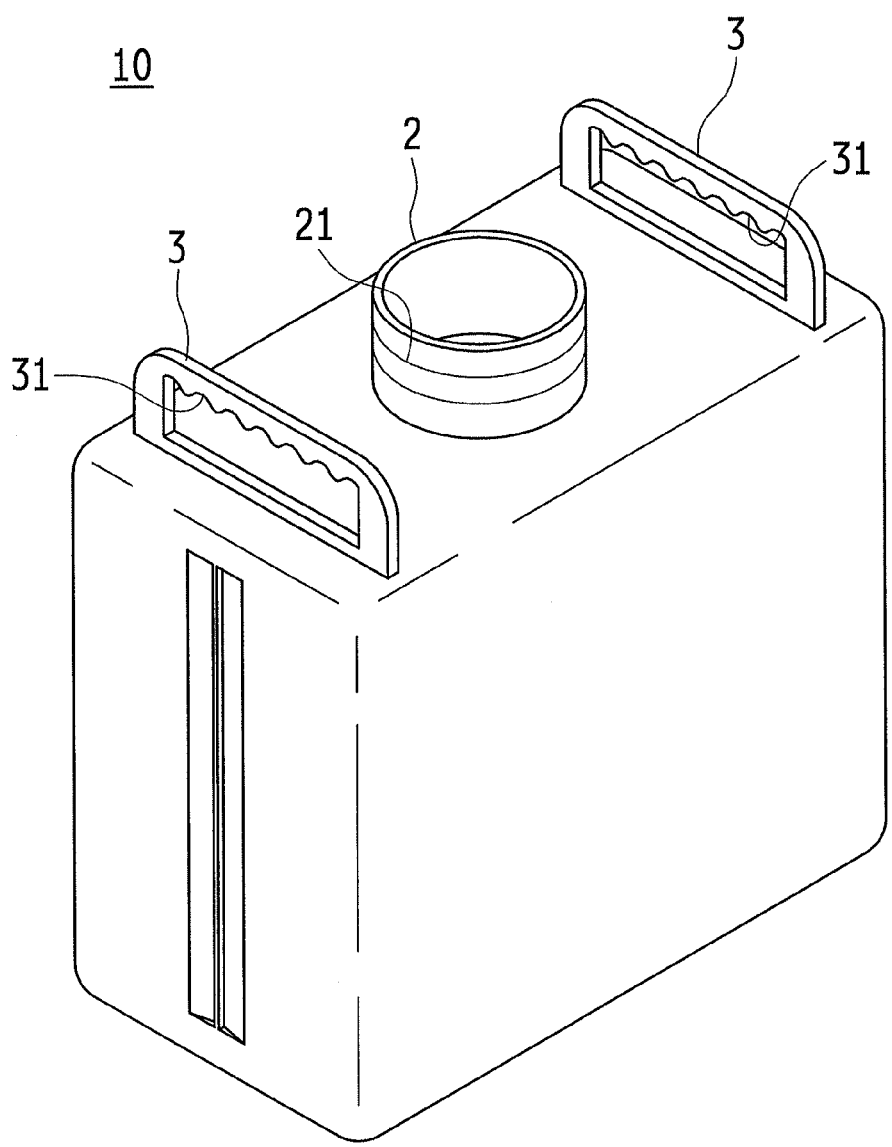
FIG. 1B is a perspective view of a variation example of the synthetic resin container in accordance with the present invention.
Figure 2A:
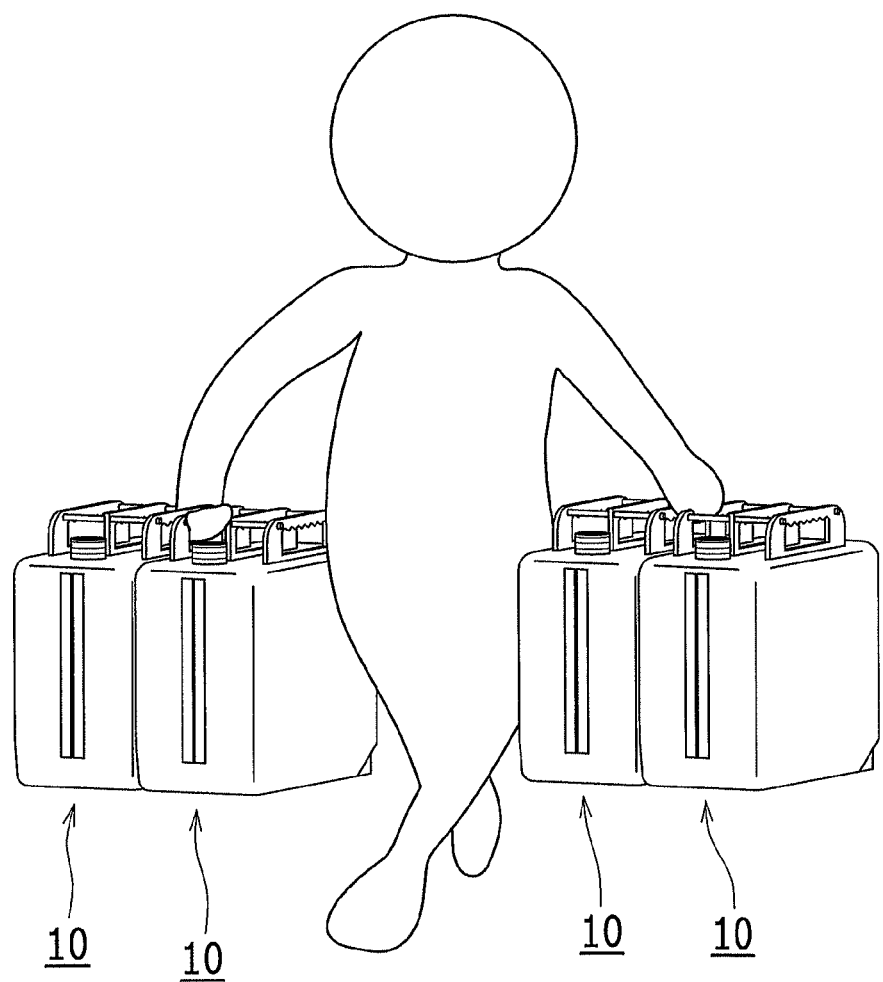
FIG. 2A is an illustration showing actual usage of the synthetic resin container in accordance with the present invention.
Figure 2B:
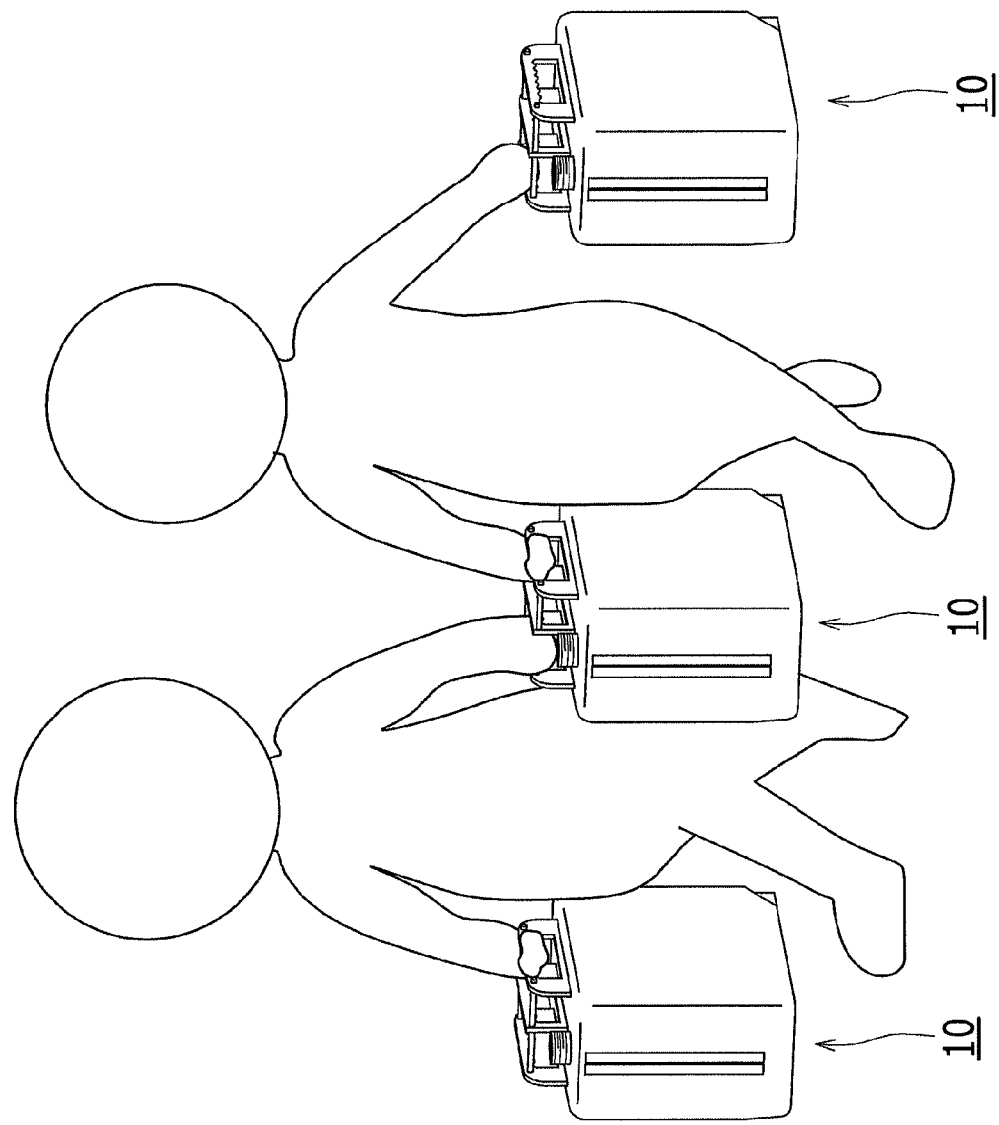
FIG. 2B is an illustration showing actual usage of the synthetic resin container in accordance with the present invention.
Figure 3A:
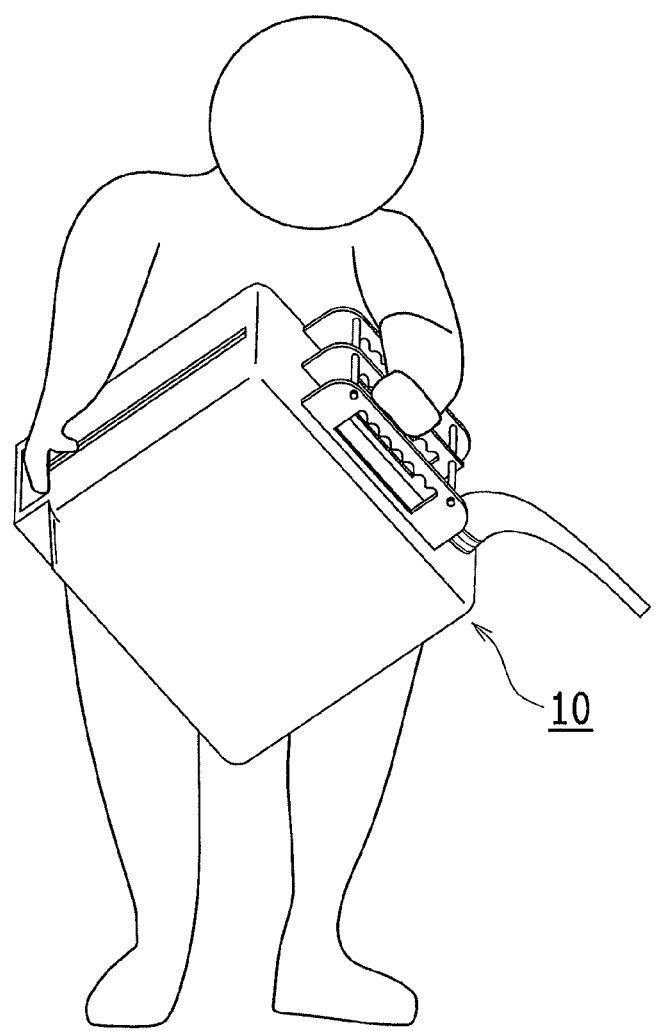
FIG. 3A is an illustration showing actual usage of the synthetic resin container in accordance with the present invention.
Figure 3B:
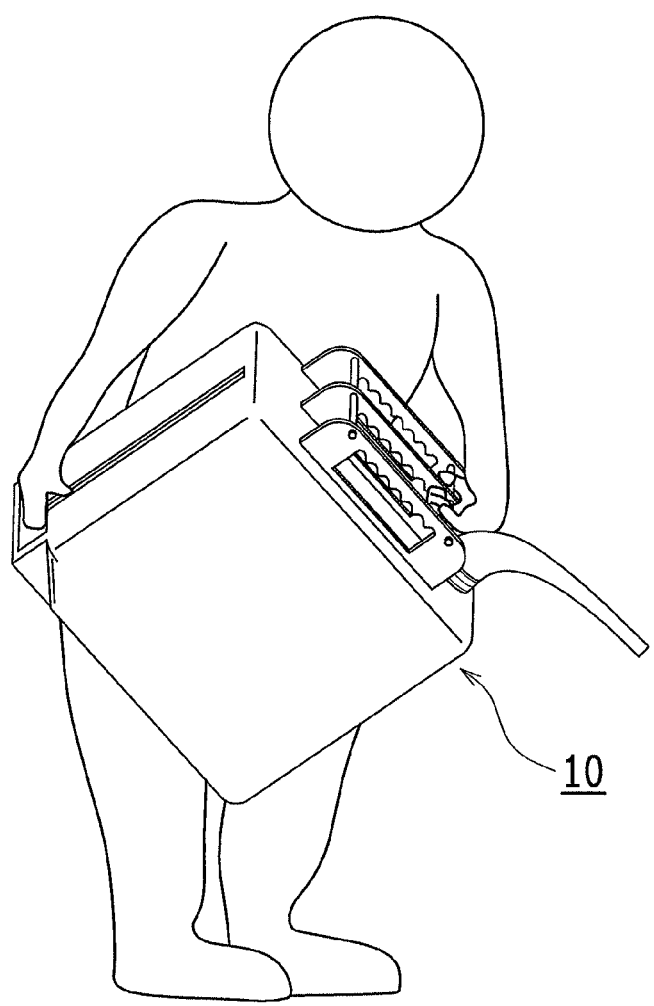
FIG. 3B is an illustration showing actual usage of the synthetic resin container in accordance with the present invention.
Figure 4:
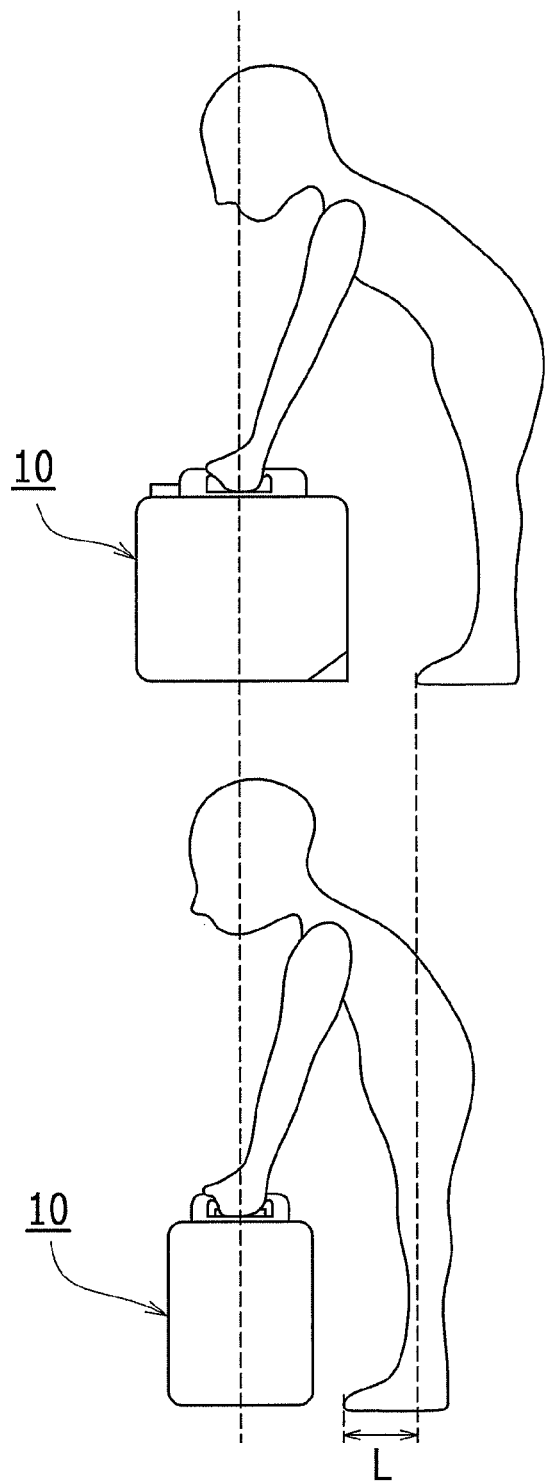
FIG. 4 is an illustration showing an advantage of a variation example of the synthetic resin container in accordance with the present invention.

FIG. 1A is a perspective view of a synthetic resin container in accordance with the present invention. FIG. 1B is a perspective view of a variation example of the synthetic resin container in accordance with the present invention. FIGS. 2A to 3B are illustrations showing actual usage of the synthetic resin container in accordance with the present invention. FIG. 4 is an illustration showing the function and effect of the synthetic resin container shown in FIG. 1B.

A synthetic resin container 10 in accordance with the present embodiment is substantially quadrate. The synthetic resin container 10 has a metal cap opening 2 formed at least near an end of its top face and three handgrips 3 disposed parallel to each other along the sides of the top face. Furthermore, the synthetic resin container 10 also has a secondary handgrip 4 on its bottom face and diagonally from the metal cap opening 2 (see FIG. 1A).

Through the side faces of each handgrip 3 disposed on the top face of the container, a hand-held wavy section 31 is formed that fits fingers. A through hole 33 (see FIG. 5(b), which will be detailed later) is formed at each end of the handgrips 3. Holder members 32 are inserted in the through holes 33 to connect the handgrips 3.

The metal cap opening 2, formed at an end of the top face, has an external thread 21 formed all around it so that the metal cap opening 2 can engage a screw cap (not shown) to tightly close the synthetic resin container 10.

Through the secondary handgrip 4 on the bottom face of the synthetic resin container 10, a hand-held wavy section 41 is formed that fits fingers similarly to the handgrips 3.

The corner of the synthetic resin container 10 where the secondary handgrip 4 is provided is fabricated to provide an inclined face. Since the width of the secondary handgrip 4 is specified to be shorter than the width of the bottom face of the synthetic resin container 10, a gap 50 is formed on the bottom face of the synthetic resin container 10 on either side of the secondary handgrip 4. Therefore, when the synthetic resin container 10 is on the ground, the synthetic resin container 10 can be readily held up by placing a hand in this gap 50.

A variation example of the synthetic resin container 10 in accordance with the present invention may, as illustrated in FIG. 1B, have a metal cap opening 2 formed at the center of its top face and handgrips 3 disposed near and along the ends of the top face. Although the synthetic resin container 10 shown as an example in FIG. 1B has no secondary handgrip 4, the synthetic resin container 10 may have a secondary handgrip 4.

Advantage of Synthetic Resin Container in Accordance with Present Embodiment

Structured as above, the synthetic resin container 10 in accordance with the present invention shown in FIG. 1A has three handgrips 3 disposed parallel to each other along the (longer) sides of its top face. Therefore, when two of these synthetic resin containers 10 are joined so that their handgrips 3 become parallel to one another, those handgrips 3 which are placed far out on each synthetic resin container 10 are closely positioned, so that one can hold both of the handgrips 3 at a time. By placing fingers under the two handgrips 3, one can carry two synthetic resin containers 10 by one hand and a maximum of four synthetic resin containers 10 by both hands at a time (see FIG. 2A). If the synthetic resin container 10 becomes heavy as more contents are put in the synthetic resin container 10, two persons can hold the handgrips 3 on two sides of the top face of the synthetic resin container 10 by reaching for them from the respective sides of the synthetic resin container 10 to cooperate and carry a single synthetic resin container 10 (see FIG. 2B).

The synthetic resin container 10 in accordance with the present invention has a secondary handgrip 4 on its bottom face and diagonally from the metal cap opening 2. When the contents of the synthetic resin container 10 are to be discharged through the metal cap opening 2, one can readily discharge the contents through the metal cap opening 2 by holding the secondary handgrip 4 as well as one of the handgrips 3 to tilt the synthetic resin container 10 (see FIG. 3A). Alternatively, one can discharge the contents through the metal cap opening 2 by grabbing the secondary handgrip 4 and one of the holder members 32 connecting the handgrips 3 (see FIG. 3B).

The number of the handgrips 3 on the top face of the synthetic resin container 10 is by no means limited to three. There may be provided two, four, or more handgrips 3.

The variation example of the synthetic resin container 10 in accordance with the present invention shown in FIG. 1B has handgrips 3 disposed near and along the ends of the top face. Therefore, as illustrated in FIG. 4, the user can hold both the handgrips 3, standing closer to the center of mass of the synthetic resin container 10 than to the center of mass of the synthetic resin container 10 shown in FIG. 1A (by distance L in FIG. 4), to carry the synthetic resin container 10. Accordingly, one does not need to bend down his/her body to lift up the synthetic resin container 10 shown in FIG. 1B as much as to lift up the synthetic resin container 10 shown in FIG. 1A. The user can lift the synthetic resin container 10 in a more comfortable posture.

Manufacturing Method for Synthetic Resin Container in Accordance with Present Embodiment Next, a manufacturing method for the synthetic resin container 10 in accordance with the present embodiment will be described. A synthetic resin container manufacturing method in accordance with the present embodiment is a method for manufacturing a synthetic resin container by blow molding, the method including an insertion component heating step, an insertion component disposing step, and a container molding step.

The following will describe the synthetic resin container manufacturing method through each of these steps.

Insertion Component Heating Step

Figure 5:
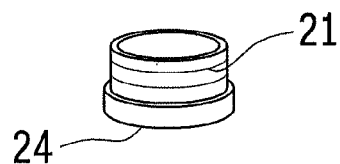
FIG. 5 is a set of illustrations showing insertion components used in the manufacture of the synthetic resin container in accordance with the present invention.
Figure 5:
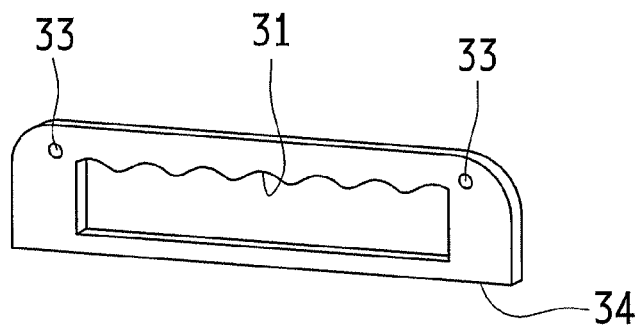
Figure 5:
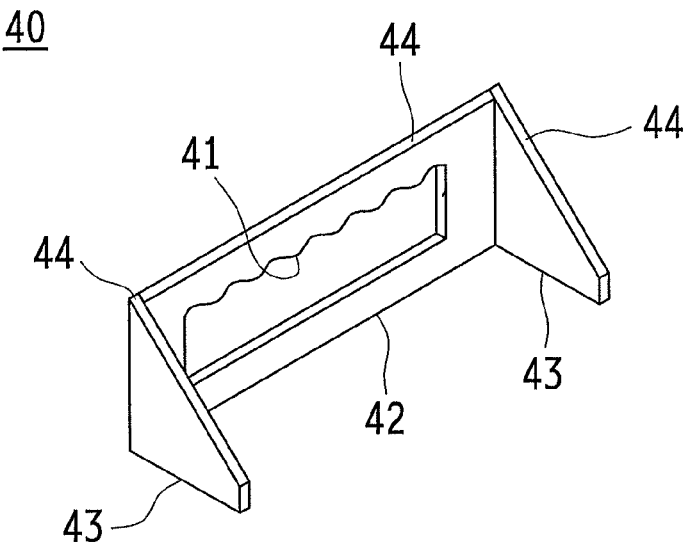
Figure 6:
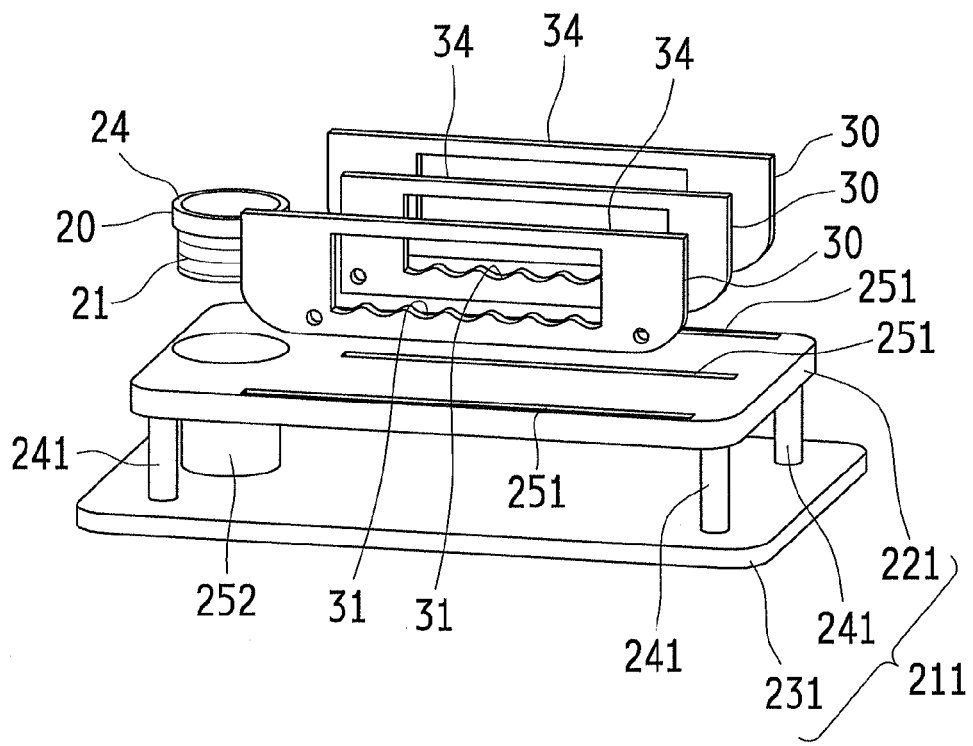
FIG. 6 is a set of illustrations showing a first component holder used in the manufacture of the synthetic resin container in accordance with the present invention.
Figure 6:
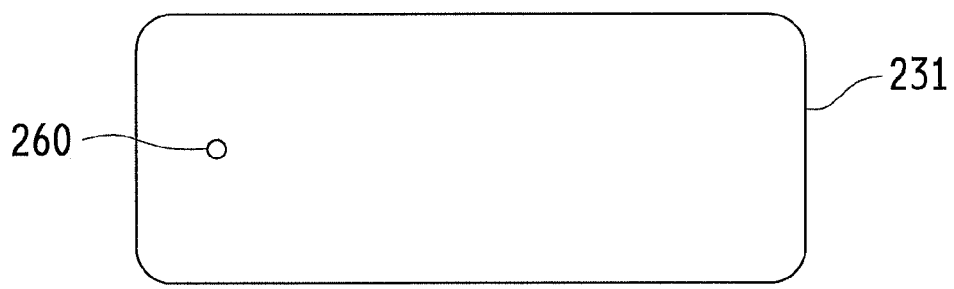
Figure 7:
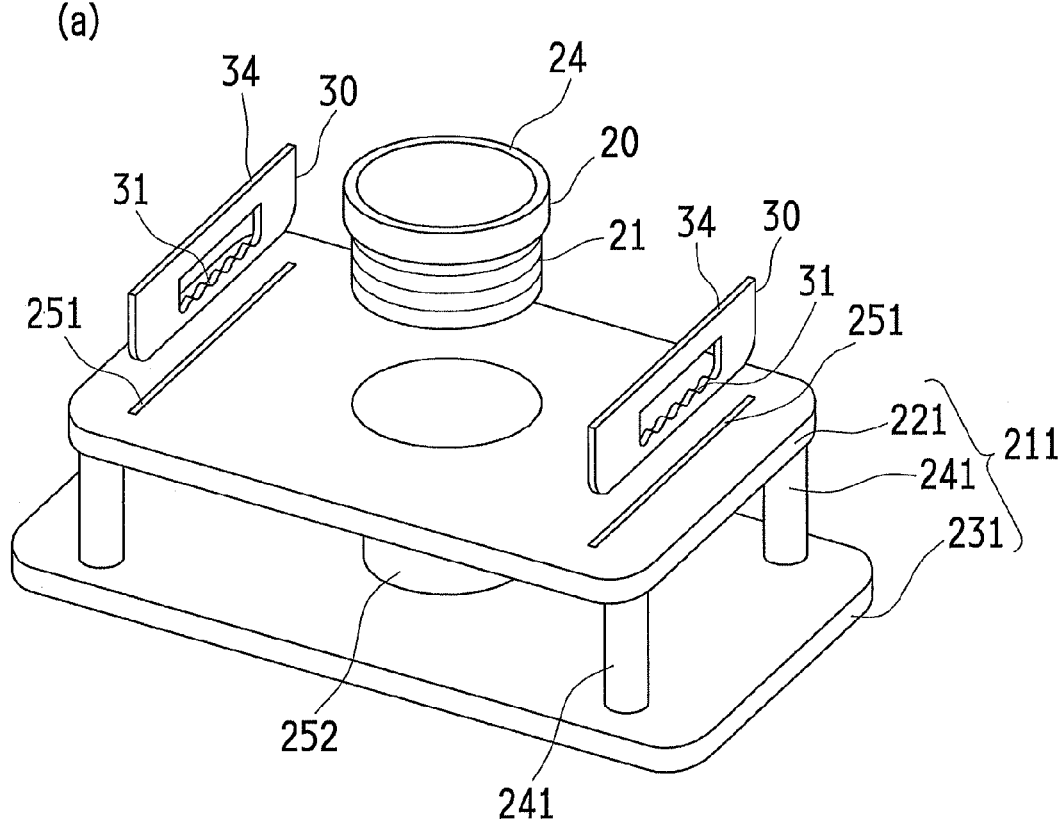
FIG. 7 is a set of illustrations showing a variation example of the first component holder used in the manufacture of the synthetic resin container in accordance with the present invention.
Figure 7:
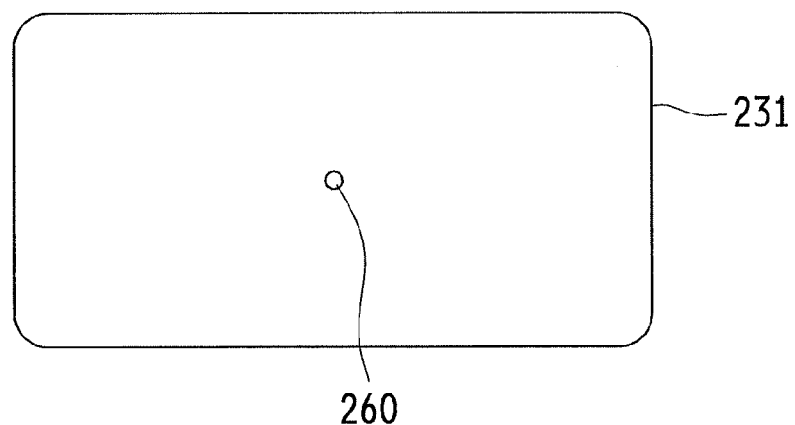
Figure 8:
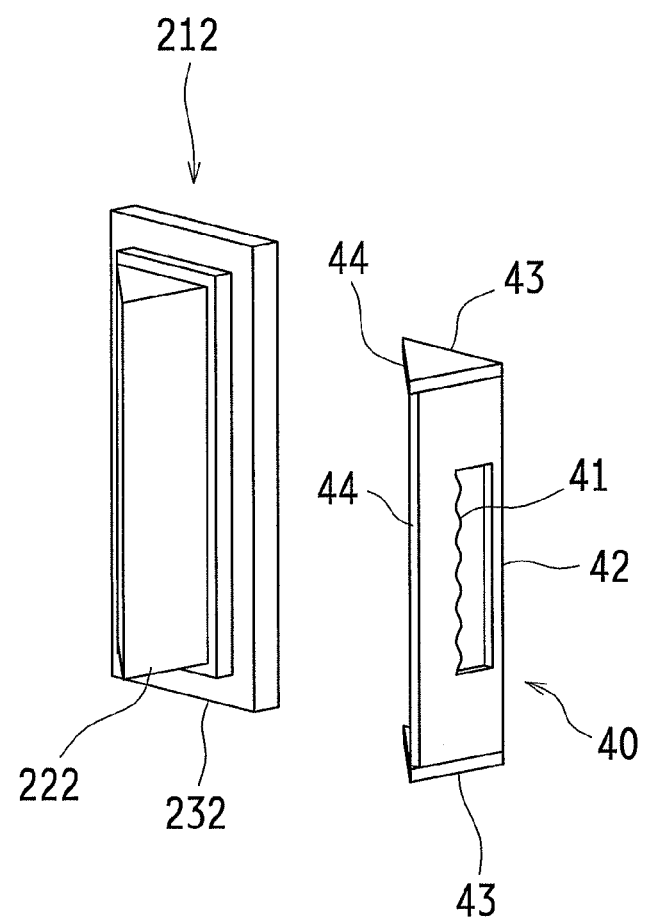
FIG. 8 is a perspective view of a second component holder used in the manufacture of the synthetic resin container in accordance with the present invention.

The insertion component heating step will be described, first, in reference to FIGS. 5 to 8. FIG. 5 is a set of illustrations showing insertion components used in the manufacture of the synthetic resin container in accordance with the present invention. FIG. 5(a) is a perspective view of a metal cap opening component. FIG. 5(b) is a perspective view of a handgrip component. FIG. 5(c) is a perspective view of a secondary handgrip component. FIG. 6 is a set of illustrations showing a first component holder used in the manufacture of the synthetic resin container in accordance with the present invention. FIG. 6(a) is a perspective view of the first component holder. FIG. 6(b) is a bottom view for FIG. 6(a). FIG. 7 is a set of illustrations showing an example of the first component holder used in the manufacture of the synthetic resin container in accordance with the present invention shown in FIG. 1B. FIG. 7(a) is a perspective view of the first component holder. FIG. 7(b) is a bottom view for FIG. 7(a). FIG. 8 is a perspective view of a second component holder used in the manufacture of the synthetic resin container in accordance with the present invention.

The insertion component heating step is a step of heating insertion components prepared by molding at the fusion temperature of the insertion components. Three insertion components are used in the present embodiment: a metal cap opening component 20 corresponding to the metal cap opening 2 of the synthetic resin container 10, handgrip components 30 corresponding to the handgrips 3 of the synthetic resin container 10, and a secondary handgrip component 40 corresponding to the secondary handgrip 4 of the synthetic resin container 10. All the components are made of polyethylene.

The metal cap opening component 20 is a cylindrical member having an external thread 21 formed on its external surface. The metal cap opening component 20 has on its lower end a fusion face 24, shaped like a flange, to which a parison P (detailed later) is to be fused (see FIG. 5(a)).

Each handgrip component 30 has formed through its side faces a hand-held wavy section 31 that fits fingers (see FIG. 5(b)). At each end of the handgrip component 30 is there formed a through hole 33 into which a holder member 32 (see FIG. 1A) is to be inserted. The bottom face of the handgrip component 30 is a fusion face 34 to which a parison P (detailed later) is to be fused.

The secondary handgrip component 40 includes a secondary handgrip main body 42 and holder members 43 (see FIG. 5(c)). The secondary handgrip main body 42 is substantially rectangular and planar. A holder member 43 is provided on either end of the secondary handgrip main body 42 to support the secondary handgrip main body 42 perpendicularly to the bottom face of the synthetic resin container 10. The secondary handgrip main body 42 has formed along its (longer) side a hand-held wavy section 41 that fits fingers. The holder members 43 fit a second holder base 222 of a second component holder 212 (detailed later). The top face of the secondary handgrip main body 42 and the inclined faces of the holder members 43 are fusion faces 44 to which a parison P (detailed later) is to be fused.

These insertion components are individually molded in advance by a publicly known resin molding method that does not produce a clearly visible parting line. Accordingly, the insertion components, especially the metal cap opening component 20, have no clearly visible parting line, allowing an external thread 21 having a specific shape to be readily formed on its external surface.

After the individual molding of the insertion components, the insertion components are attached to a component holder. The component holder, with the insertion components attached to it, will be placed inside dies 310 and 320 (detailed later) together with the insertion components.

The component holder of the present embodiment includes a first component holder 211 and a second component holder 212. The first component holder 211 gives support to the insertion components that are placed on the top face of the synthetic resin container 10 (i.e., the metal cap opening component 20 and the handgrip components 30). The second component holder 212 gives support to the insertion components that are placed on the bottom face of the synthetic resin container 10 (i.e., the secondary handgrip component 40). If a synthetic resin container 10 with no secondary handgrip 4 is to be manufactured, the first component holder 211 may be used alone.

Now, the structure of the first component holder 211 and the second component holder 212 will be described.

The first component holder 211 includes a first holder base 221 for supporting insertion components, supporting legs 241 for supporting the first holder base 221, and a first die fitting base 231, for carrying the supporting legs 241, to be placed inside the dies 310 and 320 (see FIG. 6(a)).

The first holder base 221 has parallel supporting grooves 251 formed along its sides to support the respective handgrip components 30 and a supporting tube 252 formed near one of its ends to support the metal cap opening component 20. The height of the supporting tube 252 is the same as the height of the supporting legs 241 (detailed later). The diameter of the opening of the supporting tube 252 is substantially equal to the outer diameter of the metal cap opening component 20.

The supporting legs 241 are erected on the first die fitting base 231 to support the first holder base 221 at its four corners. The supporting legs 241 are designed to have a smaller height than the handgrip components 30 supported by the supporting grooves 251 on the first holder base 221.

The first die fitting base 231 is substantially rectangular and planar and has a larger area than the first holder base 221. The ends of the first die fitting base 231 are placed in respective first placement grooves 330 of the pair of dies 310 and 320 (detailed later). The first die fitting base 231 has an insertion hole 260 formed through it where the supporting tube 252 is to come into contact with the first die fitting base 231. An air supply tube 22 is to be attached to the insertion hole 260 (detailed later; see FIG. 6(b)).

To manufacture the synthetic resin container 10 shown in FIG. 1B, the first holder base 221 shown in FIGS. 7(a) and 7(b) is used. Specifically, the supporting tube 252 is formed at the center of the first holder base 221, and the supporting grooves 251 are formed near and along both ends of the first holder base 221.

The second component holder 212 includes the second holder base 222 and a second die fitting base 232 (see FIG. 8).

The second die fitting base 232 is substantially rectangular and planar. The sides of the second die fitting base 232 are placed in respective second placement grooves 340 of the pair of dies 310 and 320 (detailed later).

The second holder base 222 is shaped substantially like a right-angled triangular prism. The second holder base 222 is designed shorter than the (longer) sides of the secondary handgrip main body 42 so that the secondary handgrip main body 42 can fit well to hold the secondary handgrip component 40 perpendicularly to the bottom face of the synthetic resin container 10.

The insertion components (i.e., the metal cap opening component 20, the handgrip components 30, and the secondary handgrip component 40) are attached to the first component holder 211 and the second component holder 212.

In the first component holder 211, the metal cap opening component 20 is inserted into the supporting tube 252 in the first holder base 221 with its top face first. Besides, the handgrip components 30 are inserted respectively into the supporting grooves 251 in the first holder base 221 with their top faces first. Since the height of the supporting legs 241 for the first holder base 221 is specified to be smaller than that of the handgrip components 30, the fusion faces 34 of the handgrip components 30 stand out above the first holder base 221. Since the flange portion of the metal cap opening component 20 contacts the first holder base 221, the fusion face 24 of the metal cap opening component 20 also stands out above the first holder base 221.

In the second component holder 212, the secondary handgrip component 40 is fitted to the second holder base 222. Therefore, the secondary handgrip main body 42 is held so that the secondary handgrip component 40 is positioned perpendicularly to the bottom face of the synthetic resin container 10.

After all the insertion components are attached to the first component holder 211 and the second component holder 212, the fusion faces 24, 34, and 44 of the insertion components are heated on a hotplate. Since the insertion components of the present embodiment are made of polyethylene, the heating temperature is set to 160° C. to 180° C., and the fusion faces 24, 34, and 44 of the insertion components are melted away by approximately 3 mm to 4 mm. That enables a parison P to be fused with the fusion faces 24, 34, and 44 when brought into contact in the container molding step (detailed later).

Insertion Component Disposing Step

Figure 9:
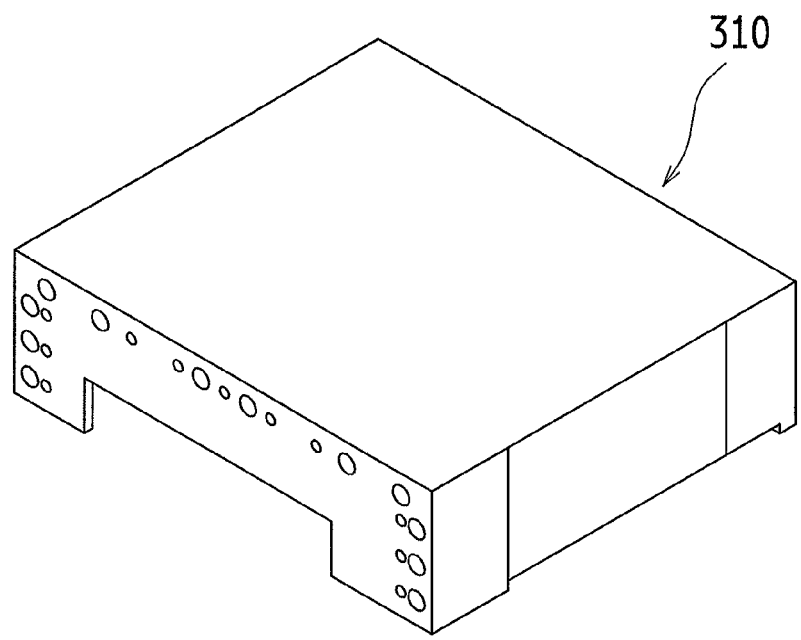
FIG. 9 is a perspective view of dies used in the manufacture of the synthetic resin container in accordance with the present invention.
Figure 9:
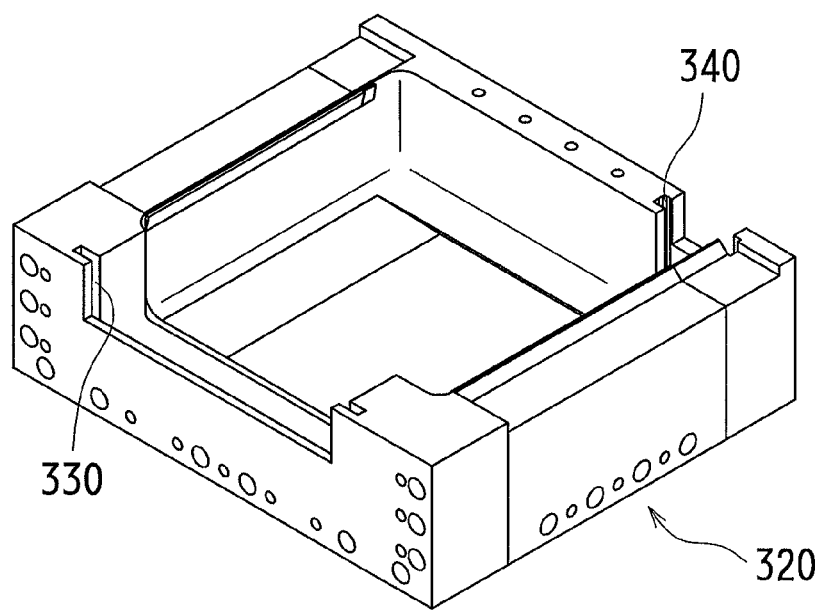
Figure 10A:
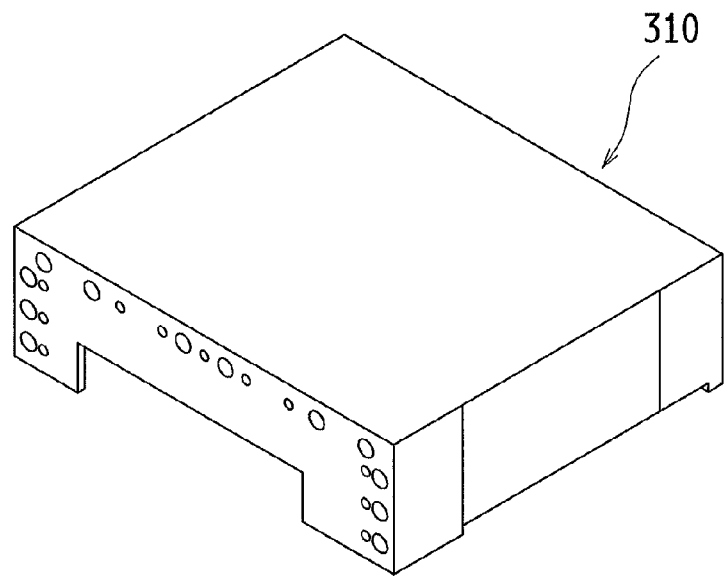
FIG. 10A is a schematic view illustrating the insertion component disposing step for the manufacture of the synthetic resin container in accordance with the present invention.
Figure 10A:
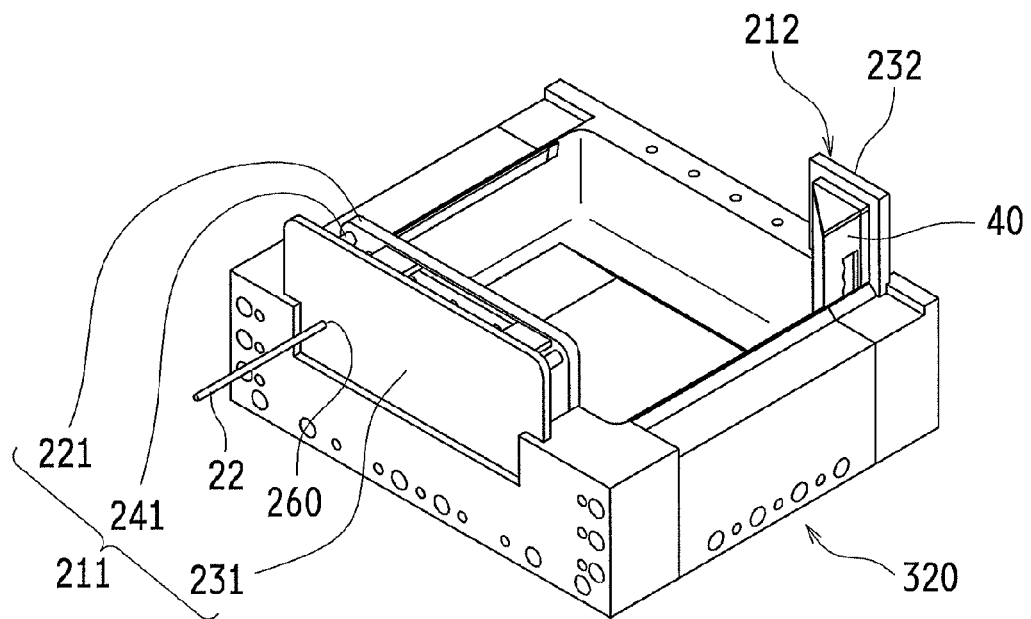
Figure 10B:
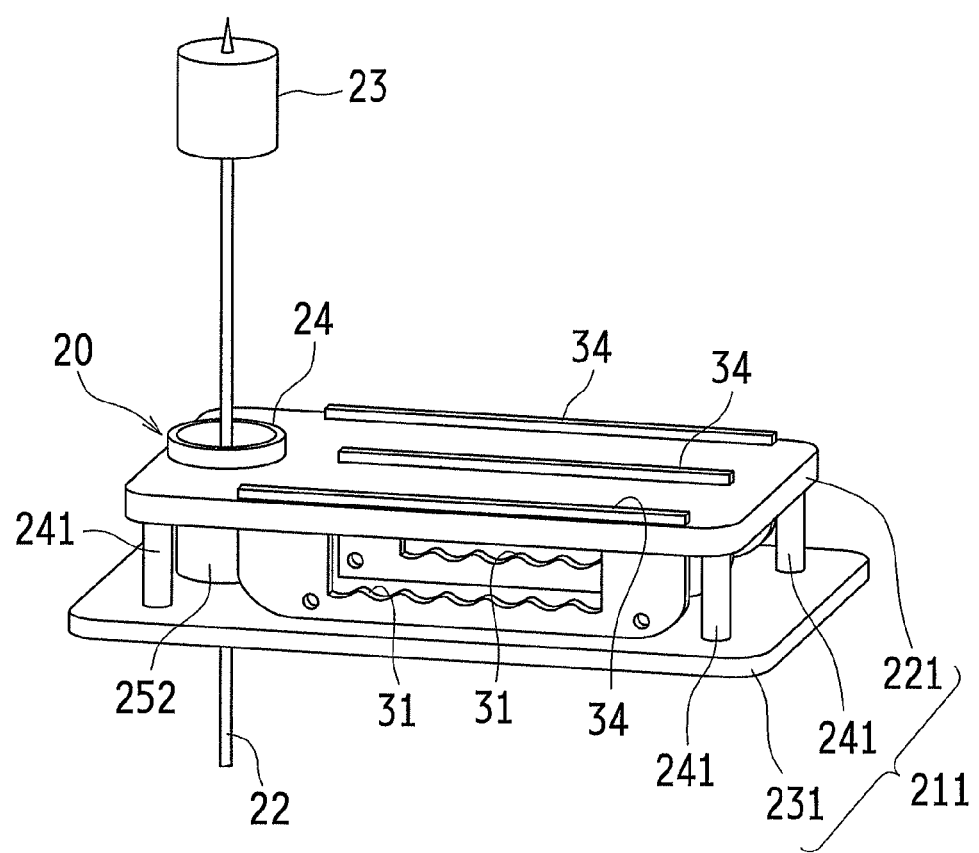
FIG. 10B is an illustration showing an air supply tube being inserted into a metal cap opening component in the insertion component disposing step for the manufacture of the synthetic resin container in accordance with the present invention.
Figure 10C:
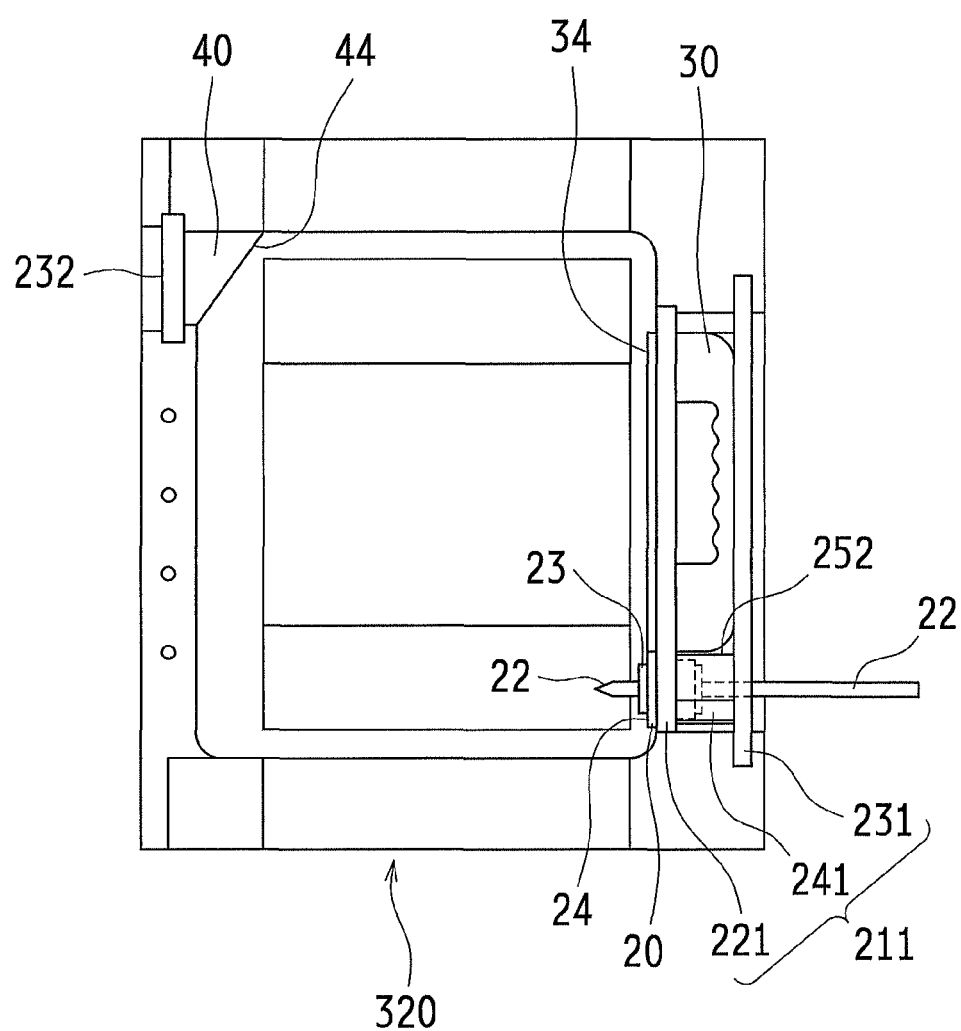
FIG. 10C is a schematic view illustrating the insertion component disposing step, as viewed from a side face of the dies, for the manufacture of the synthetic resin container in accordance with the present invention.

Next, the insertion component disposing step will be described in reference to FIGS. 9 to 10C. FIG. 9 is a perspective view of dies used in the manufacture of the synthetic resin container in accordance with the present invention. FIG. 10A is a schematic view illustrating the insertion component disposing step for the manufacture of the synthetic resin container in accordance with the present invention. FIG. 10B is an illustration showing an air supply tube being inserted into a metal cap opening component in the insertion component disposing step for the manufacture of the synthetic resin container in accordance with the present invention. FIG. 10C is a schematic view illustrating the insertion component disposing step, as viewed from a side face of the dies, for the manufacture of the synthetic resin container in accordance with the present invention.

The insertion component disposing step is a step, implemented subsequent to the insertion component heating step, of disposing the insertion components (the metal cap opening component 20, the handgrip components 30, and the secondary handgrip component 40) inside the dies 310 and 320 so that the insertion components are parallel to the direction in which a parison P is to be placed.

First, the first component holder 211 and the second component holder 212, having undergone the insertion component heating step, are placed inside the dies 310 and 320 parallel to the direction in which a parison P is to be placed.

The parison dispenser (not shown) that dispenses the parison P is located above the dies 310 and 320 so that the parison P can drop vertically from the parison dispenser.

The pair of dies 310 and 320, being of a separation type, face each other. The dies 310 and 320 are made so that they can be freely opened and clamped relative to the parison dispenser (see FIG. 9). The dies 310 and 320 each have therein a cavity that matches the shape of the synthetic resin container 10. On one side of the parting face, parallel to the direction in which a parison P is to be placed, where the dies 310 and 320 are joined with each other, there is formed a first placement groove 330 in which the first component holder 211 is to be placed. The first placement groove 330 is designed to have the same length as the first die fitting base 231. Furthermore, a second placement groove 340 in which the second component holder 212 is to be placed is formed on a face opposite the face on which the first component holder 211 is to be placed and diagonally from the metal cap opening component 20. The second placement groove 340 is designed to have the same length as the ends (shorter sides) of the second die fitting base 232.

In the dies 310 and 320, a sealing member 23 and the air supply tube 22 are inserted into the hole in the metal cap opening component 20 after fixing the first component holder 211 to the first placement groove 330 and the second component holder 212 to the second placement groove 340 (see FIGS. 10A and 10B).

The sealing member 23 is provided for the purpose of preventing the parison P from entering the hole in the metal cap opening component 20 when air is blown into a parison P (detailed later) to inflate the parison P. Therefore, the outer diameter of the sealing member 23 is equal to the diameter of the hole in the metal cap opening component 20. The sealing member 23 tightly fits the interior of the hole in the metal cap opening component 20. The air supply tube 22, having a smaller diameter than that of the sealing member 23, is inserted and secured at the center of the sealing member 23.

The air supply tube 22 is provided for the purpose of supplying external air to the parison P. The air supply tube 22 has a tip so sharpened that it can penetrate the parison P.

Since the sealing member 23 is inserted into the hole in the metal cap opening component 20 in this manner, the metal cap opening component 20 tightly fit by the sealing member 23 slides inside the dies 310 and 320 by sliding the air supply tube 22 inserted through the sealing member 23 relative to the first component holder 211 (see FIG. 10C).

Container Molding Step

Next, the container molding step will be described in reference to FIGS. 11A to 15 which are schematic views illustrating the container molding step for the manufacture of the synthetic resin container in accordance with the present invention.

The container molding step is a step, implemented subsequent to the insertion component disposing step, of placing a parison P in the dies 310 and 320 and clamping the dies 310 and 320 and of subsequently blowing air into the parison P to fuse the parison P and the insertion components.

The following will be described the container molding step in detail.

Figure 11A:
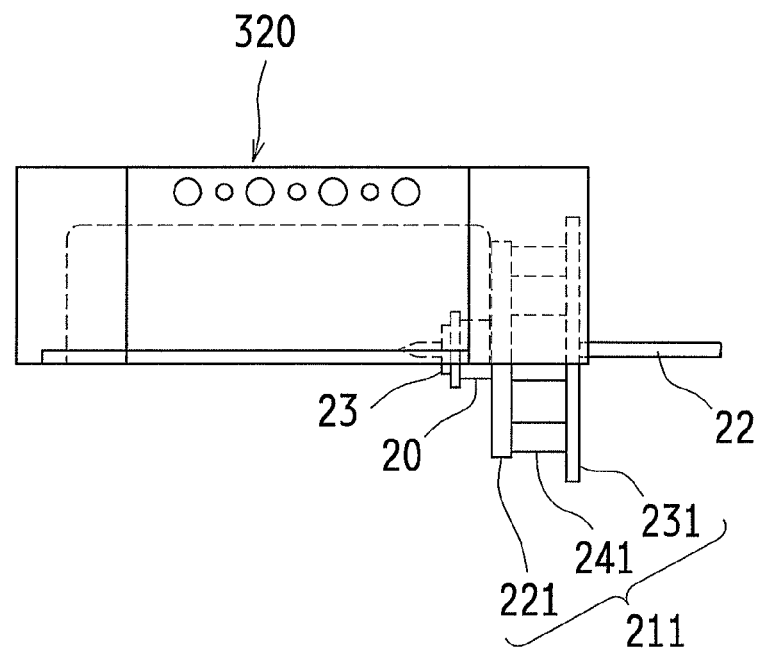
FIG. 11A is a schematic view illustrating the container molding step, as viewed from above the dies, for the manufacture of the synthetic resin container in accordance with the present invention.
Figure 11A:
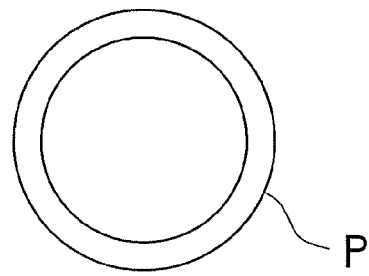
Figure 11A:
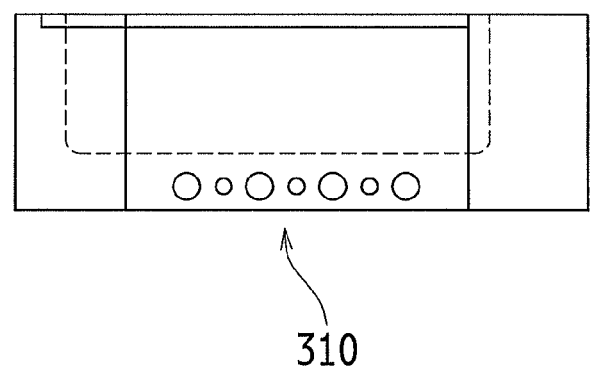
Figure 11B:
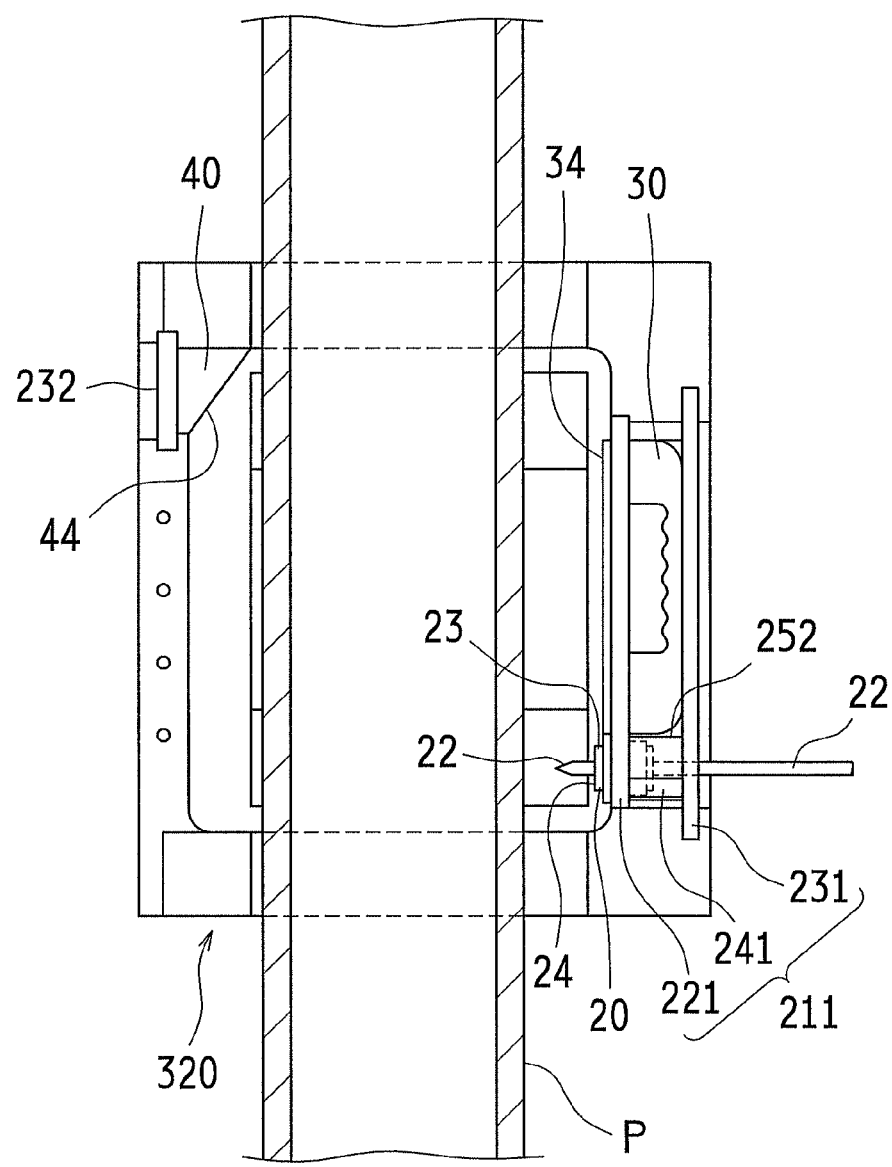
FIG. 11B is a schematic view illustrating the container molding step, as viewed from a side face of the dies, for the manufacture of the synthetic resin container in accordance with the present invention.
Figure 12A:
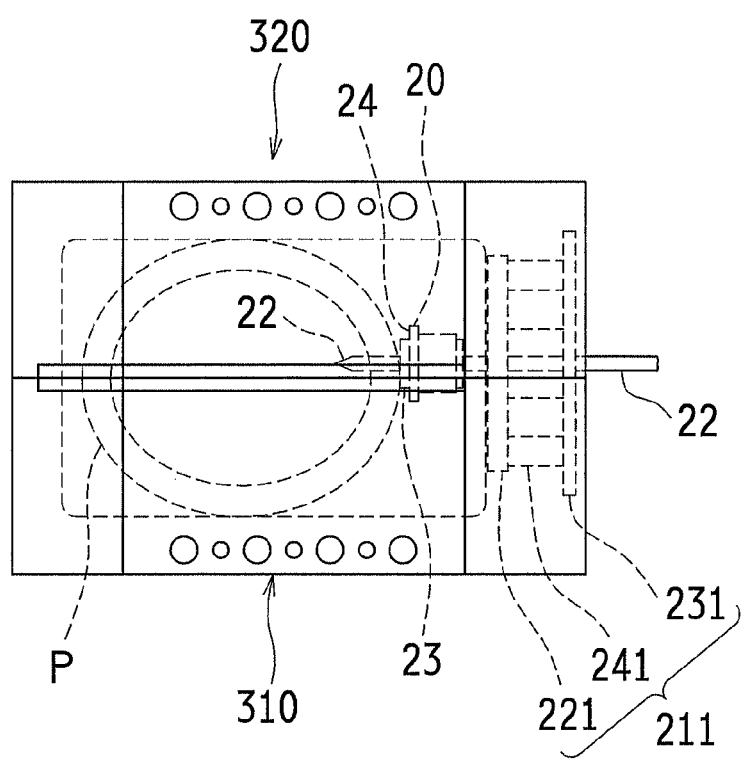
FIG. 12A is a schematic view illustrating the container molding step, as viewed from above the dies, for the manufacture of the synthetic resin container in accordance with the present invention.
Figure 12B:
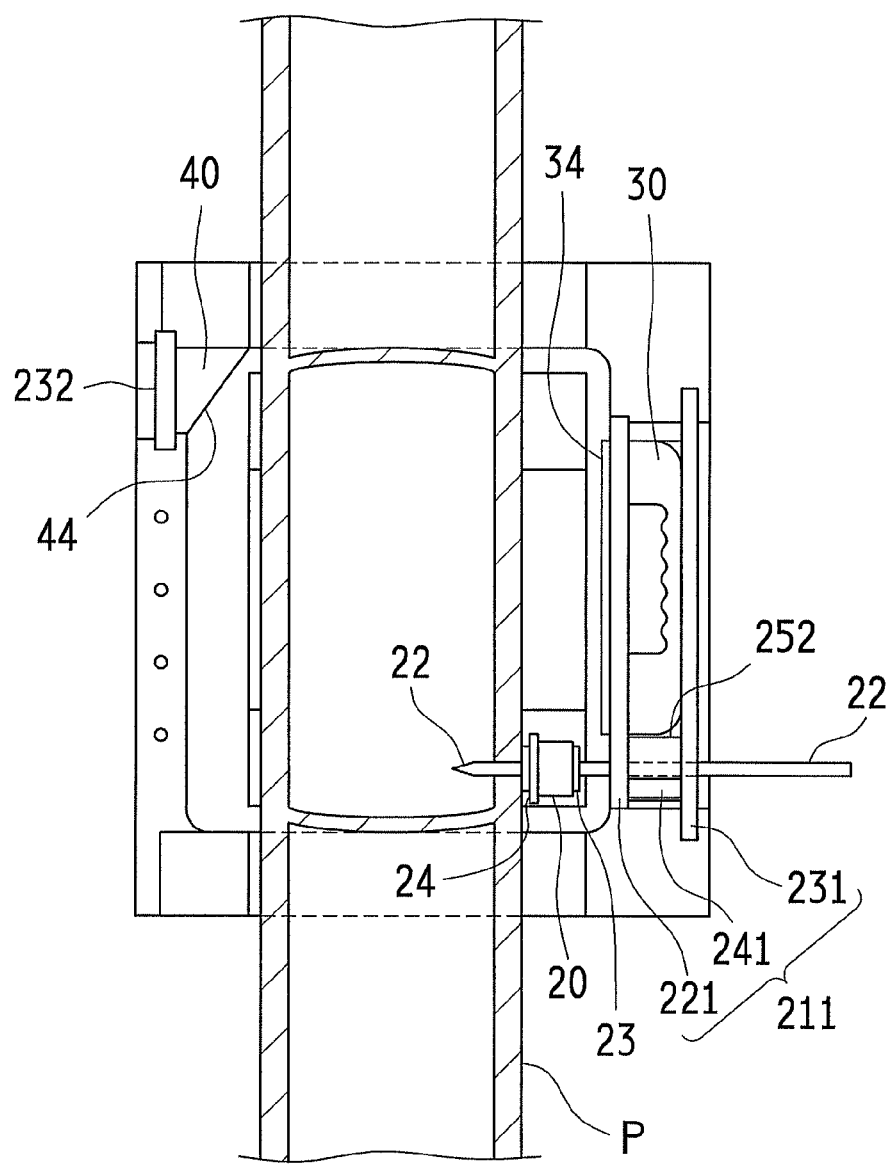
FIG. 12B is a schematic view illustrating the container molding step, as viewed from a side face of the dies, for the manufacture of the synthetic resin container in accordance with the present invention.

First, the parison dispenser dispenses a parison P vertically into the open mold (dies 310 and 320) from above the mold, to place the parison P in the cavities in the dies 310 and 320 (see FIGS. 11A and 11B). In so doing, the air supply tube 22 is slid to move the metal cap opening component 20 closer to the parison P in advance (i.e., the metal cap opening component 20 is moved away from the first component holder 211). The handgrip components 30 may be placed near the parison P in advance (i.e., the handgrip components 30 may be moved away from the first component holder 211).

Next, the parison P is sandwiched between the pair of dies 310 and 320, and then the mold is clamped. At the same time, the air supply tube 22 is further slid so that the tip of the air supply tube 22 can penetrate the parison P (see FIGS. 12A and 12B). That brings the metal cap opening component 20 and the sealing member 23 into contact with the parison P.

Figure 13A:
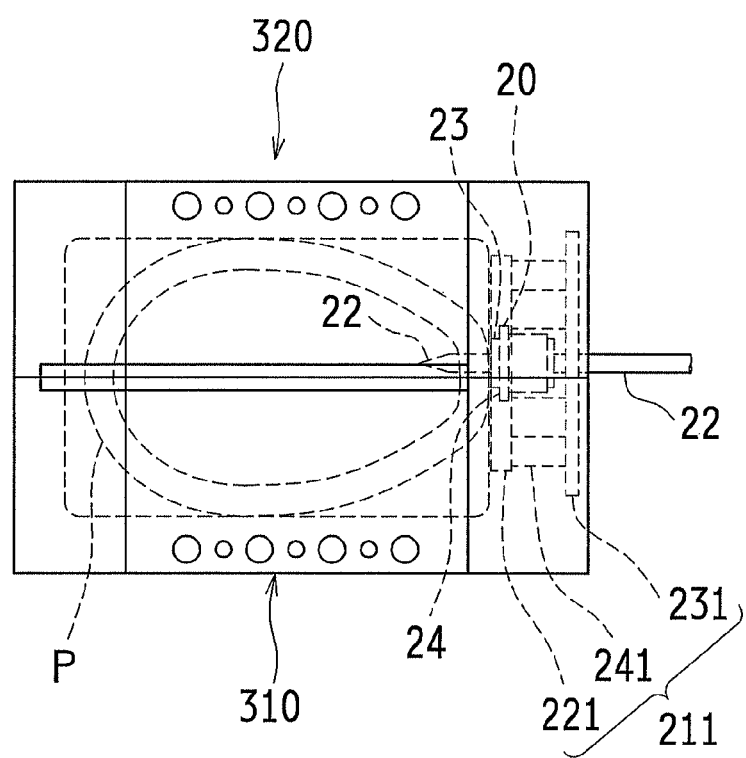
FIG. 13A is a schematic view illustrating the container molding step, as viewed from above the dies, for the manufacture of the synthetic resin container in accordance with the present invention.
Figure 13B:
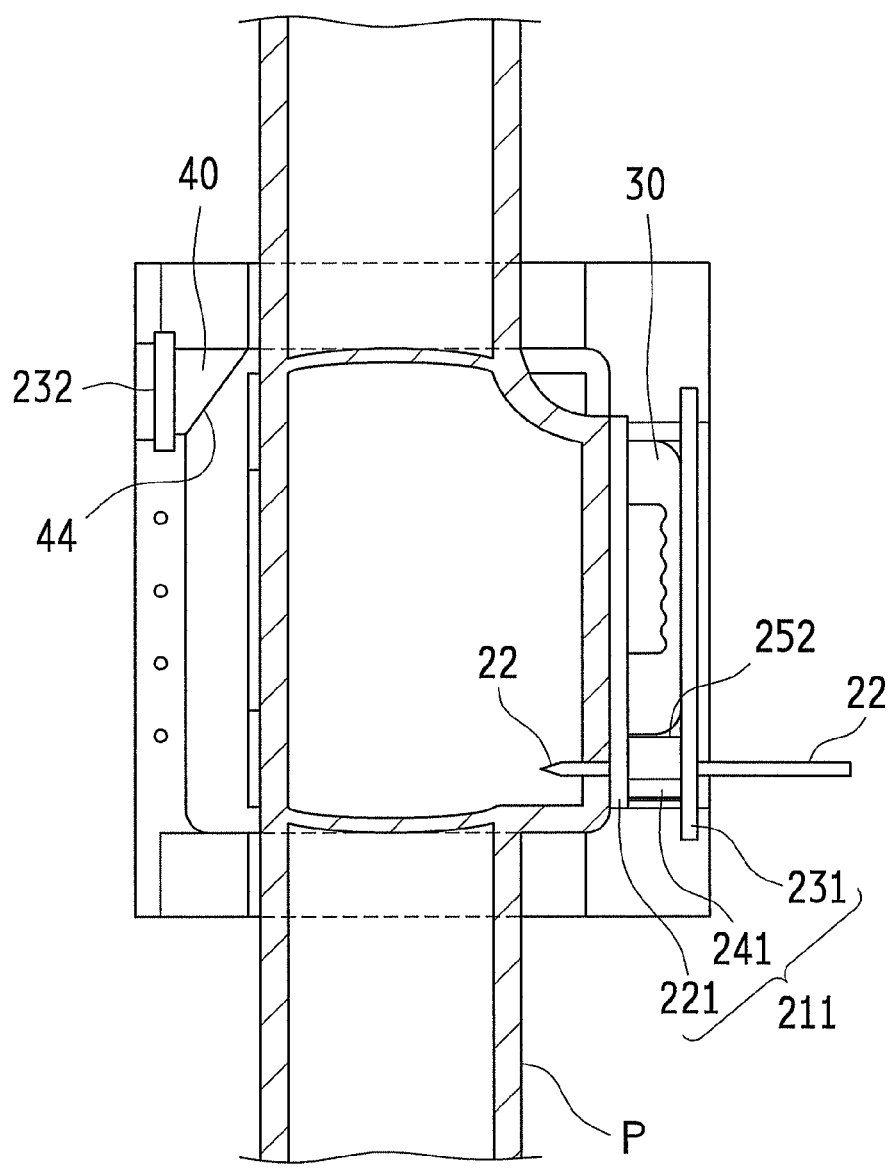
FIG. 13B is a schematic view illustrating the container molding step, as viewed from a side face of the dies, for the manufacture of the synthetic resin container in accordance with the present invention.
Figure 14A:
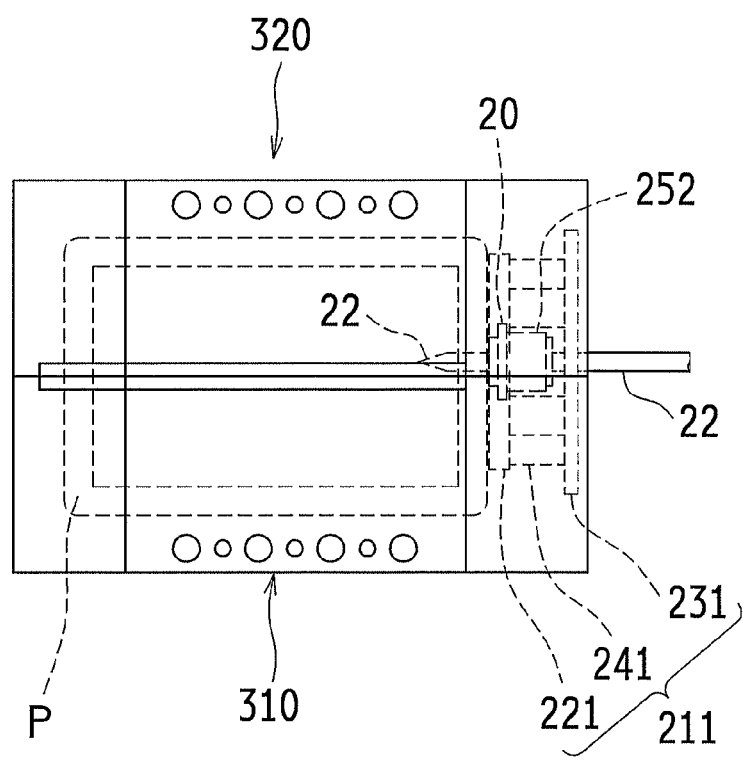
FIG. 14A is a schematic view illustrating the container molding step, as viewed from above the dies, for the manufacture of the synthetic resin container in accordance with the present invention.
Figure 14B:
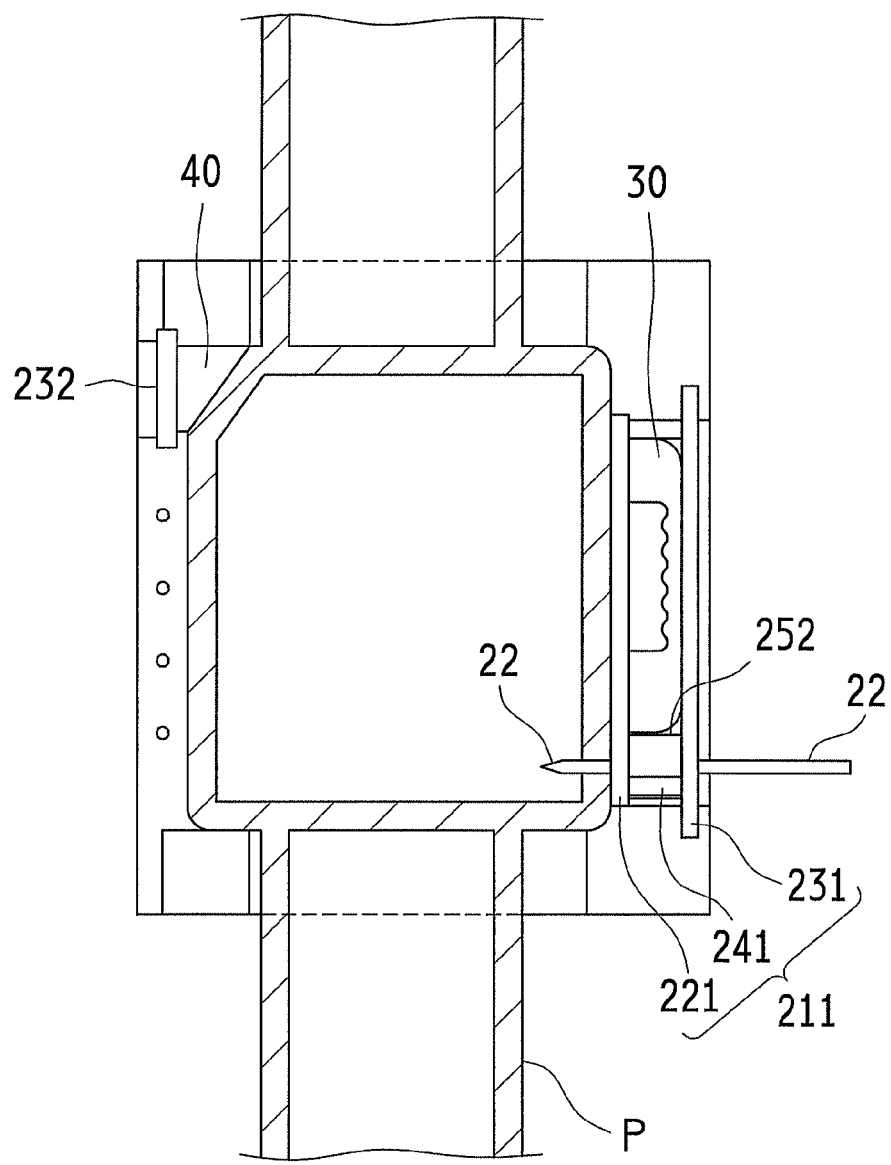
FIG. 14B is a schematic view illustrating the container molding step, as viewed from a side face of the dies, for the manufacture of the synthetic resin container in accordance with the present invention.
Figure 15:
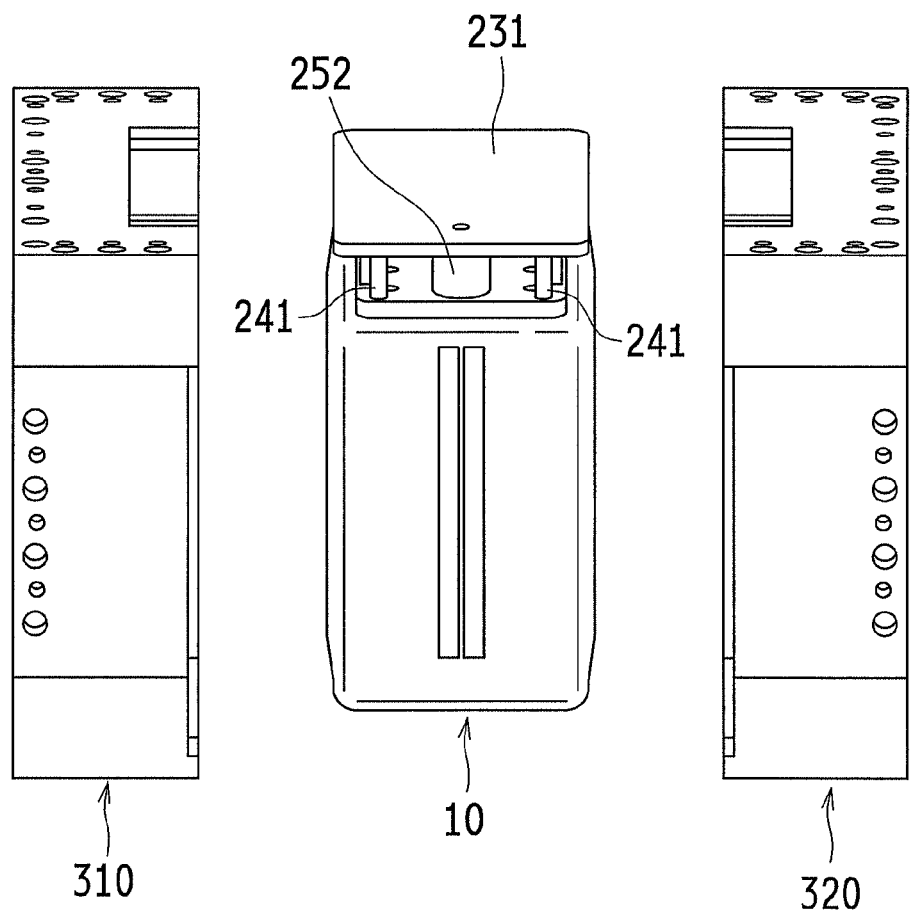
FIG. 15 is a schematic view illustrating the container molding step, as viewed obliquely from above the dies, for the manufacture of the synthetic resin container in accordance with the present invention.

Next, compressed air is supplied into the parison P through the air supply tube 22 (see FIGS. 13A and 13B). Since the sealing member 23 tightly fits the parison P, the air supplied into the parison P can inflate the parison P without leaking to the outside. The parison P inflates, starting from where the metal cap opening component 20 and the handgrip components 30 are provided. The inflating parison P pushes back the metal cap opening component 20, which is in contact with the parison P, in a direction approaching the first component holder 211. Meanwhile, the parison P contacts the handgrip components 30 which are held in such a manner that they stand out above the first component holder 211.

After the parison P inflates where the metal cap opening component 20 and the handgrip components 30 are provided, the parison P inflates where the secondary handgrip is provided. That brings the secondary handgrip component 40 held by the second component holder 212 into contact with the parison P. Since the fusion faces 24, 34, and 44 of the handgrip components 30, the secondary handgrip component 40, and the metal cap opening component 20 were melted in the insertion component heating step, the handgrip components 30, secondary handgrip component 40, and the metal cap opening component 20 are fused and integrated to the parison P. Simultaneously, the parison P is molded into a shape that matches the cavities in the dies 310 and 320 (see FIGS. 14A and 14B).

After the parison P has sufficiently hardened, the dies 310 and 320 are opened (see FIG. 15), and the molded article is ejected from the dies 310 and 320. Thereafter, the first component holder 211 and the second component holder 212 are removed from the molded article. Then, the holder member 32 is inserted into the through holes 33 in the handgrips 3, connecting the handgrips 3 with each other. The holder member 32 and the handgrips 3 are then fused. A synthetic resin container 10 including handgrips 3 on its top face is manufactured in this manner.

Advantage of Synthetic Resin Container Manufacturing Method in Accordance with Present Embodiment As described above, according to the present embodiment, at least the molded handgrip components 30 are disposed as the insertion components inside the dies 310 and 320 in advance, so that the insertion components and the parison P into which air is blown are fused and molded inside the dies 310 and 320. Therefore, synthetic resin containers 10 can be manufactured which may have a complex structure including multiple handgrips 3. In addition, since the metal cap opening component 20 is prepared by molding as an insertion component, synthetic resin containers 10 can be manufactured that include a metal cap opening 2 with no parting line as clearly visible as in conventional art.

Furthermore, the metal cap opening component 20 is brought into contact with the parison P in advance before air is blown into the parison P. Therefore, the parison P and the metal cap opening component 20 can be fused reliably without any failure in fusing them.

In the method of manufacturing the synthetic resin container 10 in accordance with the present embodiment, the insertion component heating step, the insertion component disposing step, and the container molding step may be implemented in parallel by using multiple sets of first and second component holders 211 and 212 for holding insertion components. Specifically, if a minimum of two sets of first and second component holders 211 and 212 are prepared, a first set of first and second component holders 211 and 212 may be placed in the dies 310 and 320 for blow molding, and concurrently, a second set of first and second component holders 211 and 212 may be subjected to the insertion component heating step, to efficiently manufacture synthetic resin containers 10.

All the embodiments of the present invention described above are for illustrative purposes only and by no means limit the scope of the present invention.

INDUSTRIAL APPLICABILITY

The present invention is applicable to synthetic resin containers with a plurality of handgrips on their top face and also to manufacturing methods for such containers.

REFERENCE SIGNS LIST

10 Synthetic Resin Container
2 Metal Cap Opening
20 Metal Cap Opening Component
3 Handgrip
30 Handgrip Component
4 Secondary Handgrip
40 Secondary Handgrip Component
30, 41 Hand-held Wavy Section
24, 34, 44 Fusion Face
310, 320 Dies
P Parison

The invention claimed is:
1. A method for manufacturing a synthetic resin container by blow molding, the synthetic resin container comprising:
    an opening formed at least near an end of a top face of the synthetic resin container; and
    a plurality of handgrips disposed parallel to each other on the top face, said method comprising:
    preparing the opening and the plurality of handgrips as insertion components by molding, and heating fusion portions of the insertion components at a fusion temperature of the insertion components;
    after the molding and the heating of the fusion portions of the insertion components, disposing the insertion components having heated fusion portions in dies with the heated fusion portions of the insertion components being positioned to face interiors of the dies, so that the insertion components are parallel to a direction in which a parison is to be placed; and
    after the disposing of the insertion components, placing the parison in the dies and clamping the dies, and subsequently blowing air into the parison through the opening to fuse the parison and the insertion components.

2. The method as set forth in claim 1, further comprising, prior to the blowing of the air into the parison, sliding either at least the opening or all the insertion components into the dies.

3. The method as set forth in claim 1, further comprising preparing a secondary handgrip as another insertion component by molding and disposing the secondary handgrip on a bottom face of the synthetic resin container and diagonally from the opening.

4. The method as set forth in claim 3, wherein all or any one of the plurality of handgrips and the secondary handgrip have formed thereon a hand-held wavy section that fits fingers.

5. A synthetic resin container manufactured by the method as set forth in claim 1.

6. The synthetic resin container as set forth in claim 5, further comprising a secondary handgrip on a bottom face of the container main body and diagonally from the opening.

7. The method as set forth in claim 2, further comprising preparing a secondary handgrip as another insertion component by molding and disposing the secondary handgrip on a bottom face of the synthetic resin container and diagonally from the opening.

8. The method as set forth in claim 7, wherein all or any one of the plurality of handgrips and the secondary handgrip have formed thereon a hand-held wavy section that fits fingers.

9. A synthetic resin container manufactured by the method as set forth in claim 2.

10. A synthetic resin container manufactured by the method as set forth in claim 3.

11. A synthetic resin container manufactured by the method as set forth in claim 4.

12. A synthetic resin container manufactured by the method as set forth in claim 7.

13. A synthetic resin container manufactured by the method as set forth in claim 8.

14. The synthetic resin container as set forth in claim 9, further comprising a secondary handgrip on a bottom face of the container main body and diagonally from the opening.

15. The synthetic resin container as set forth in claim 10, further comprising a secondary handgrip on a bottom face of the container main body and diagonally from the opening.

16. The synthetic resin container as set forth in claim 11, further comprising a secondary handgrip on a bottom face of the container main body and diagonally from the opening.

17. The synthetic resin container as set forth in claim 12, further comprising a secondary handgrip on a bottom face of the container main body and diagonally from the opening.

18. The synthetic resin container as set forth in claim 13, further comprising a secondary handgrip on a bottom face of the container main body and diagonally from the opening.

* * * * *